US011761972B2

(12) United States Patent
Inaba et al.

(10) Patent No.: US 11,761,972 B2
(45) Date of Patent: Sep. 19, 2023

(54) AUTOMATED ANALYSIS DEVICE (71) Applicant: Hitachi High-Tech Corporation, Tokyo (JP)

(72) Inventors: Tooru Inaba, Tokyo (JP); Ruochi Hsu, Tokyo (JP); Shinya Matsuoka, Tokyo (JP); Takeshi Yokokawa, Tokyo (JP); Daisuke Ebihara, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 687 days.

(21) Appl. No.: 16/964,798

(22) PCT Filed: Jan. 28, 2019

(86) PCT No.: PCT/JP2019/002714
§ 371 (c)(1),
(2) Date: Jul. 24, 2020

(87) PCT Pub. No.: WO2019/163431
PCT Pub. Date: Aug. 29, 2019

(65) Prior Publication Data
US 2021/0063424 A1    Mar. 4, 2021

(30) Foreign Application Priority Data
Feb. 20, 2018  (JP) .................................. 2018-028207

(51) Int. Cl.
*G01N 35/04*  (2006.01)
(52) U.S. Cl.
CPC ..... *G01N 35/04* (2013.01); *G01N 2035/0477* (2013.01)

(58) Field of Classification Search
CPC ........... G01N 35/04; G01N 2035/0477; G01N 1/4077; G01N 35/0098;
(Continued)

(56) References Cited

U.S. PATENT DOCUMENTS 6,033,574 A * 3/2000 Siddiqi ..................... B03C 1/24
436/526
2020/0164322 A1* 5/2020 Renick ............... G01N 35/0098

FOREIGN PATENT DOCUMENTS

JP  2009-162733 A   7/2009
JP  2009162733 A *  7/2009
(Continued)

OTHER PUBLICATIONS

International Search Report (PCT/ISA/210) issued in PCT Application No. PCT/JP2019/002714 dated Mar. 12, 2019 with English translation (three (3) pages).
(Continued)

*Primary Examiner* — P. Kathryn Wright
*Assistant Examiner* — Curtis A Thompson
(74) *Attorney, Agent, or Firm* — Crowell & Moring LLP (57) ABSTRACT

The objective of the present disclosure is to provide a technique for reducing a quantity of magnetic particles remaining on a reaction vessel wall surface in a cleaning step for reducing, in a stepwise manner, an amount of a magnetic particle solution in the reaction vessel. The automated analysis device according to the present disclosure causes an agitating mechanism to operate in such a way that a magnetic substance remaining on the wall surface of the vessel in the previous cleaning step is captured by a cleaning solution in the next cleaning step.

5 Claims, 10 Drawing Sheets

(58) Field of Classification Search
CPC .......... G01N 2035/00524; G01N 2035/00564; B03C 1/01; B03C 1/284; B03C 2201/18; B03C 2201/22; B03C 2201/26; B03C 1/288
See application file for complete search history.

(56) References Cited

FOREIGN PATENT DOCUMENTS

| | | | |
|---|---|---|---|
| JP | 2013-217882 A | | 10/2013 |
| JP | 2013-223820 A | | 10/2013 |
| JP | 2014-70915 A | | 4/2014 |
| JP | 2014-122826 A | | 7/2014 |
| JP | 2014122826 A | * | 7/2014 |
| JP | 2015-227855 A | | 12/2015 |
| JP | 2016-47491 A | | 4/2016 |

OTHER PUBLICATIONS

Japanese-language Written Opinion (PCT/ISA/237) issued in PCT Application No. PCT/JP2019/002714 dated Mar. 12, 2019 (three (3) pages).
Supplementary European Search Report issued in European Application No. 19757584.8 dated Sep. 28, 2021 (11 pages).

* cited by examiner

AUTOMATED ANALYSIS DEVICE

TECHNICAL FIELD

The present disclosure relates to an automated analysis device that utilizes magnetic particles to separate a substance to be measured from a coexisting substance.

BACKGROUND ART

In order to analyze a liquid sample derived from a biological body such as blood or urine with high sensitivity, a technique for selectively identifying a substance to be measured from a sample containing a large amount of coexisting substances is required. As such a technique, a labeled antibody method is known in which the substance to be measured is separated from the sample using magnetic particles.

In the labeled antibody method, (a) magnetic particles to which a non-labeled antibody that performs an antigen-antibody reaction with the substance to be measured is bonded and (b) a labeled antibody labeled with a labeling substance are contained in the sample, and a target substance to be measured is bonded to the magnetic particles and the labeling substance. Then, the magnetic particles are magnetically separated from the sample to remove the coexisting substance, the substance to be measured is eluted from the magnetic particles, and photometry of the labeling substance is performed, so that a content of the target substance can be measured.

In an automated analysis device that performs the above series of steps, a concentration of the substance to be measured may be increased in order to improve sensitivity of measurement. For example, the coexisting substance is removed (cleaning step) by bonding the substance to be measured to the magnetic particles, capturing the magnetic particles by magnetically separation, and aspirating a reaction solution, the substance to be measured is eluted with a smaller amount of solution in an elution step, and thus a concentration of the substance to be measured is increased. Accordingly, the substance to be measured can be measured with high sensitivity. Further, in the cleaning step, the magnetic particles may be prevented from remaining on a reaction vessel wall surface by performing magnetic separation and agitation while gradually reducing an amount of a cleaning solution to be injected.

PTL 1 below describes a reagent agitating device that slows down a rotation speed of an agitator when a reagent remaining amount decreases.

CITATION LIST

Patent Literature

PTL 1: JP-A-2013-217882

SUMMARY OF INVENTION

Technical Problem

In a magnetic particle cleaning and concentration step performed by an automated analysis device, an amount of a cleaning solution for the magnetic particles is reduced in a stepwise manner in a plurality of times, and a substance to be measured is concentrated while cleaning. In general, as the number of cleaning increases, a concentration of the magnetic particles increases. On the other hand, when the concentration of the magnetic particles is high in cleaning and concentration, a quantity of the magnetic particles remaining on the reaction vessel wall surface is increased. When the magnetic particles remain on a vessel wall surface, the number of magnetic particles remaining in a solution during a cleaning and concentration step is reduced, and the concentration efficiency is lowered. Further, since a remaining amount is not constant, deterioration of reproducibility is also expected.

According to a method described in PTL 1, a rotation speed of an agitator is slowed down as a reagent remaining amount decreases to prevent empty aspiration of a reagent (see 0031). In an analysis device of the related art such as the one described in PTL 1, a problem that the magnetic particles remain on a reaction vessel wall surface is not necessarily specifically examined.

The present disclosure has been made in view of the above circumstances, and an object of the present disclosure is to provide a technique for reducing a quantity of magnetic particles remaining on a reaction vessel wall surface in a cleaning step for reducing, in a stepwise manner, an amount of a magnetic particle solution in a reaction vessel, that is, for preventing reduction in concentration efficiency (decrease in the number of magnetic particles in a solvent).

Solution to Problem

An automated analysis device according to the present disclosure causes the agitating mechanism to operate in such a way that a magnetic substance remaining on a wall surface of a vessel in a previous cleaning step is captured by a cleaning solution in a next cleaning step.

Advantageous Effect

According to the present disclosure, a quantity of magnetic particles remaining on a reaction vessel wall surface can be reduced in a cleaning step for reducing, in a stepwise manner, an amount of a magnetic particle solution in the reaction vessel. As a result, reduction in concentration efficiency due to the magnetic particles remaining in a solution in a cleaning and concentration step can be prevented. Further, since the magnetic particles remaining on an inner wall of the reaction vessel are reduced, fluctuation of a measurement result due to the remaining can be prevented. Problems, configurations, and effects other than those described above will be further clarified with the following description of embodiments.

DESCRIPTION OF EMBODIMENTS

First Embodiment

Figure 1:
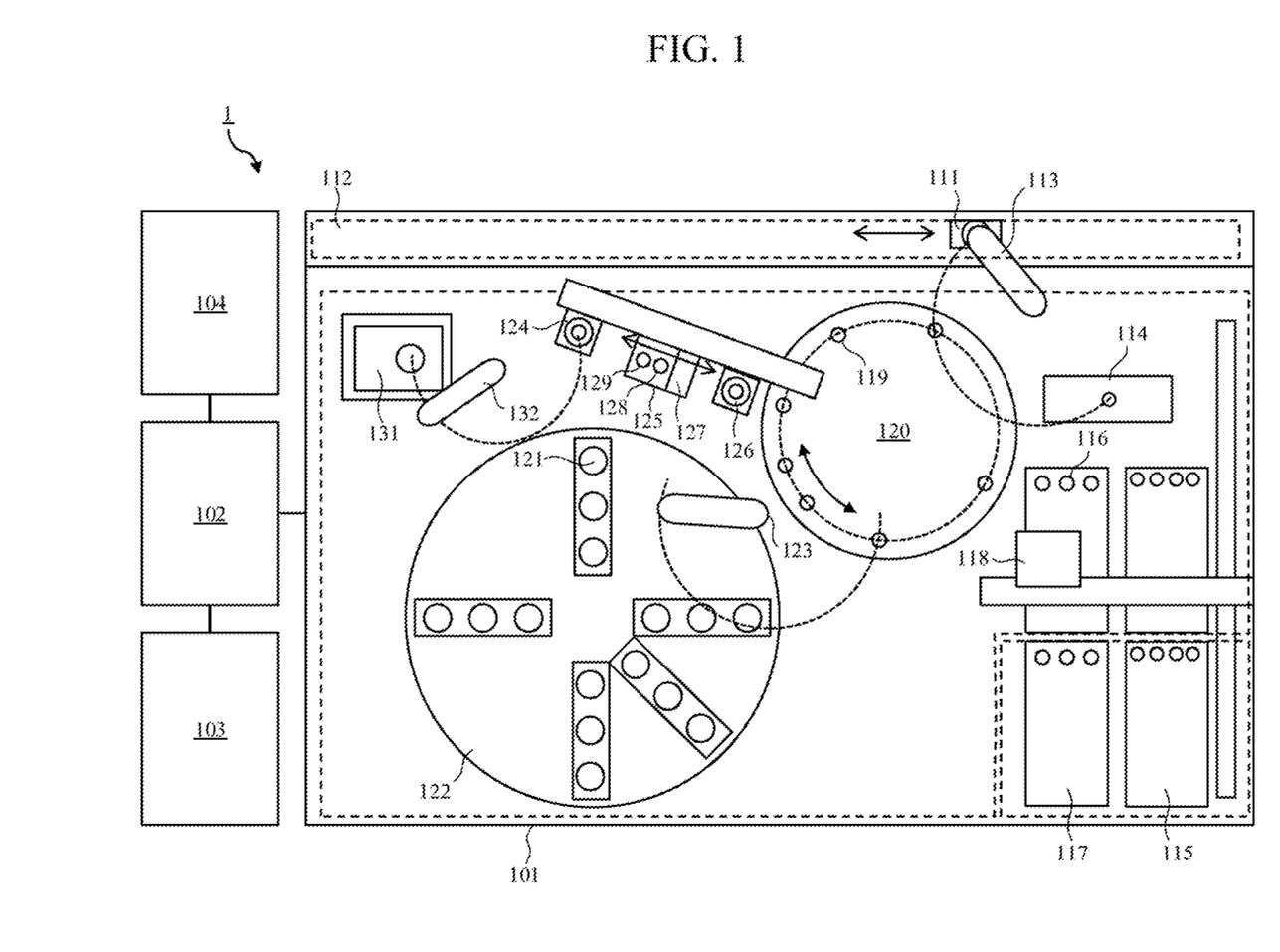
FIG. 1 is a schematic diagram of an automated analysis device 1 according to a first embodiment.

FIG. 1 is a schematic diagram of an automated analysis device 1 according to a first embodiment of the present disclosure. The automated analysis device 1 includes an analysis unit 101, a control unit 102, an input unit 103, and a display unit 104. The analysis unit 101 performs an analysis operation. The control unit 102 controls an overall operation of the device by controlling each unit provided in the device. The input unit 103 is an interface used by a user to input information to the automated analysis device 1. The display unit 104 displays information to the user. The input unit 103 and the display unit 104 may be integrated, and an example thereof includes a touch-panel monitor. The control unit 102 includes a calculation device such as a central processing unit (CPU), and reads and executes a program for controlling a dispensing amount of a cleaning solution, for example.

The analysis unit 101 includes a first transport mechanism 112, a sample dispensing mechanism 113, a dispensing tip attaching and detaching unit 114, a dispensing tip mounting rack 115, a reaction vessel mounting rack 117, a second transport mechanism 118, a reaction vessel disk 120, a reagent disk 122, a reagent dispensing mechanism 123, a magnetic separation device 124, a transport and aspiration dispensing mechanism 125, an agitating mechanism 126, a detecting unit 131, and a dispensing mechanism 132 for the detecting unit.

The first transport mechanism 112 transports a sample vessel 111 containing a sample to a sample sorting position. The sample dispensing mechanism 113 aspirates and dispenses the sample. The dispensing tip attaching and detaching unit 114 attaches and detaches a disposable dispensing tip for the sample dispensing mechanism 113 to and from the sample dispensing mechanism 113. The dispensing tip mounting rack 115 has a dispensing tip mounted thereon. A reaction vessel 116 is mounted in the reaction vessel mounting rack 117. The second transport mechanism 118 transports the dispensing tip and the reaction vessel 116. The reaction vessel disk 120 can hold the reaction vessel 116 with a liquid therein being kept at a constant temperature. The reaction vessel disk 120 includes a plurality of openings 119. The reagent disk 122 holds a reagent vessel 121 containing a measurement reagent. The reagent dispensing mechanism 123 dispenses the measurement reagent to the reaction vessel 116. The magnetic separation device 124 includes a magnet, which is used to capture magnetic particles 21 in the reaction vessel 116 onto an inner wall of the reaction vessel 116. The agitating mechanism 126 agitates a liquid contained in the reaction vessel 116 in a non-contact manner. The transport and aspiration dispensing mechanism 125 can aspirate and dispense a solution in the reaction vessel 116 while transporting the reaction vessel 116 among the reaction vessel disk 120, the magnetic separation device 124, and the agitating mechanism 126. The detecting unit 131 detects a component in blood. The dispensing mechanism 132 for the detecting unit aspirates the component in the extracted blood in the reaction vessel 116 and dispenses the component to the detecting unit 131.

An outline of analysis steps of the automated analysis device 1 will be described below with reference to FIG. 1. Prior to analysis, the automated analysis device 1 transports the reaction vessel 116 from the reaction vessel mounting rack 117, and places the reaction vessel 116 in the opening 119 on the reaction vessel disk 120.

The sample dispensing mechanism 113 accesses the dispensing tip attaching and detaching unit 114 prior to dispensing of the sample, and the dispensing tip attaching and detaching unit 114 attaches a dispensing tip to a tip end of the sample dispensing mechanism 113. The sample dispensing mechanism 113 aspirates the sample from the sample vessel 111 via the dispensing tip, and dispenses the sample to the reaction vessel 116 on the reaction vessel disk 120. When the sample dispensing from one sample vessel 111 is completed, the sample dispensing mechanism 113 discards the dispensing tip to the dispensing tip attaching and detaching unit 114.

The reagent dispensing mechanism 123 aspirates the measurement reagent from the reagent vessel 121 containing the magnetic particles 21 on the reagent disk 122 and dispenses the measurement reagent to the reaction vessel 116 on the reaction vessel disk 120. The reaction vessel disk 120 functions as, for example, an incubator, and the reaction vessel 116 installed in the opening 119 is incubated for a constant time.

The reaction proceeds by the incubation of a constant time, and the substance to be measured and the magnetic particles 21 are bonded in the reaction vessel 116. Thereafter, the automated analysis device 1 performs a cleaning step and an elution step so as to improve the analysis accuracy. The expression "the substance to be measured and the magnetic particles are bonded" means that, for example, a non-labeled antibody, which is bonded to the magnetic particles 21, and the substance to be measured are bonded in an antigen-antibody reaction.

Figure 2:
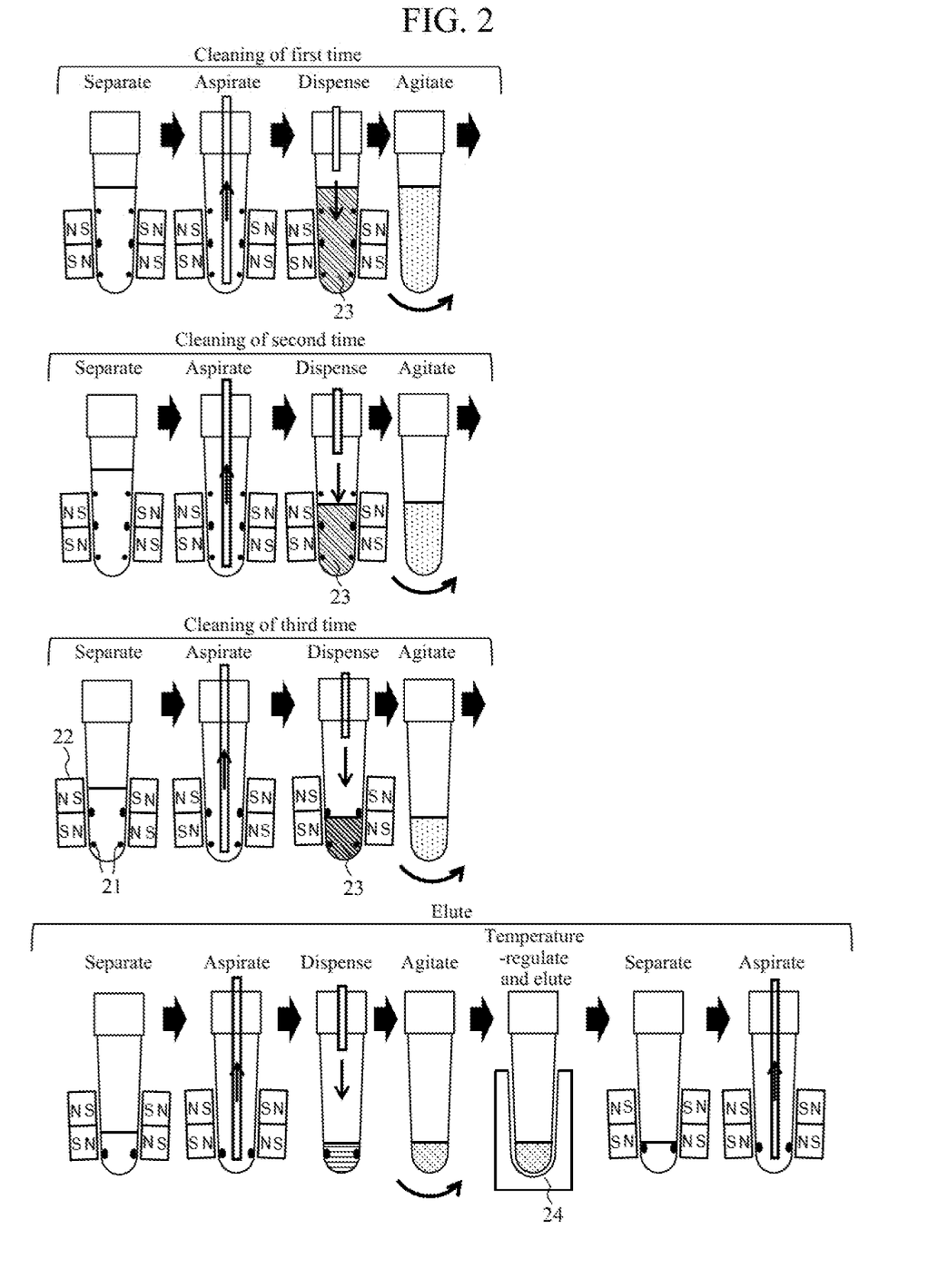
FIG. 2 is a schematic diagram showing a flow of a cleaning and concentration step for extracting a substance to be measured contained in a sample.

FIG. 2 is a schematic diagram showing a flow of a cleaning and concentration step for extracting the substance to be measured contained in the sample. In order to perform the cleaning and concentration step for extracting the substance to be measured from the sample, the automated analysis device 1 performs a cleaning step by performing a combination of separation, aspiration, dispensation, and agitation, and an elution step for separating the bonded substance to be measured from the magnetic particles 21.

As shown in FIG. 2, in the first embodiment, the cleaning step is performed three times, and a coexisting substance floating in the solution without binding to the magnetic particles 21 is removed. The automated analysis device 1 sequentially reduces an amount of a cleaning solution 23 to be injected in each cleaning step performed three times. For example, the amount of the cleaning solution 23 of a first time is 250 μL, the amount of the cleaning solution 23 of a second time is 160 μL, and the amount of the cleaning solution 23 of a third time is 80 μL. In the elution step, 40 μL of an elution solution is injected and a temperature thereof is regulated to separate and elute the substance to be measured from the magnetic particles 21.

Figure 3:
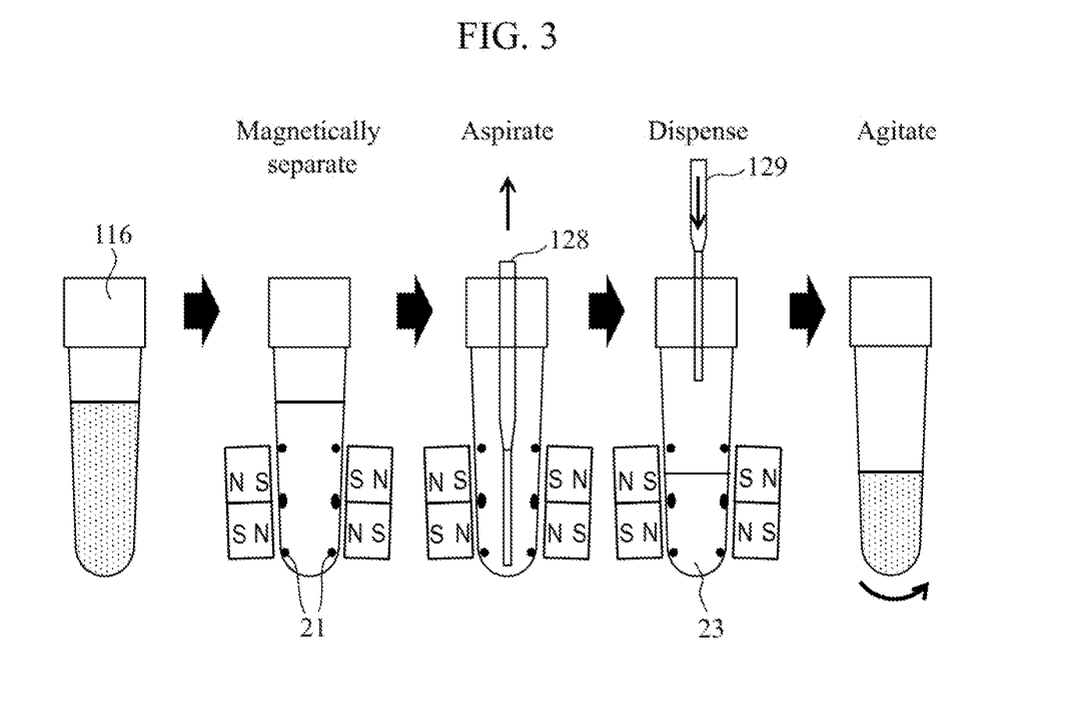
FIG. 3 is a diagram showing a flow of a cleaning step.

FIG. 3 is a diagram showing a flow of the cleaning step. Hereinafter, the cleaning step will be described with reference to FIGS. 1 and 3.

The reaction vessel 116 containing a solution in which the magnetic particles 21 are suspended is transported to the magnetic separation device 124 by a gripping mechanism 127 of the transport and aspiration dispensing mechanism 125. A configuration example of the magnetic separation device 124 will be described later.

After the magnetic particles 21 are captured, the automated analysis device 1 aspirates the solution containing no magnetic particles 21 in the reaction vessel 116 by using an aspiration nozzle 128 of the transport and aspiration dispensing mechanism 125. Subsequently, the automated analysis device 1 dispenses the cleaning solution 23 from a dispensing nozzle 129 of the transport and aspiration dispensing mechanism 125 to the reaction vessel 116. According to an arrangement of magnets 51 and 52 to be described later, the magnetic particles 21 hardly remain in a center portion of a magnet height, and the magnetic particles 21 are attracted to positions indicated by black circles in FIG. 3 since magnetic field strength increases at ends of the magnets 51 and 52. Therefore, by aligning a height of a liquid surface to a position where the magnetic field strength is low (a place where there are a few magnetic particles 21), it is possible to prevent the magnetic particles 21 from being aspirated as much as possible during the solution aspiration in the subsequent cleaning step.

Thereafter, the reaction vessel 116 containing the magnetic particles 21 and the cleaning solution 23 is transported to the agitating mechanism 126 by the gripping mechanism 127 of the transport and aspiration dispensing mechanism 125. Since the magnetic particles 21 in the reaction vessel 116 transferred to the agitating mechanism 126 are not affected by the magnetic field, the magnetic particles are isolated and re-suspended in the solution by being agitated by the agitating mechanism 126. A configuration example of the non-contact agitating mechanism 126 will be described later. In a case of using the non-contact agitating mechanism 126, the sample or reagent is not brought out due to the solution remaining on the agitator, so that the accuracy of analysis is improved. After the magnetic particles 21 are re-suspended by the agitating mechanism 126, the reaction vessel 116 is transported again to the magnetic separation device 124, and the cleaning step of a second time is performed.

In the first embodiment, the automated analysis device 1 performs the cleaning step three times. In the cleaning step performed from the second time, since the amount of the cleaning solution 23 dispensed into the reaction vessel 116 is controlled such that the amount of the cleaning solution 23 dispensed into the reaction vessel 116 is less than the amount of a solution contained in the reaction vessel 116 prior to an aspiration operation, the amount of the cleaning solution 23 dispensed at the second time is less than the amount of the cleaning solution 23 dispensed at the first time. Similarly, the amount of the cleaning solution 23 dispensed at the third time is smaller than the amount of the cleaning solution 23 dispensed at the second time. The cleaning step is performed by repeating magnetic separation and agitation a plurality of times to remove foreign substances. By sequentially reducing the amount of the cleaning solution 23 each time the cleaning step is performed, the amount of the cleaning solution 23 to be used can be saved.

Figure 4:
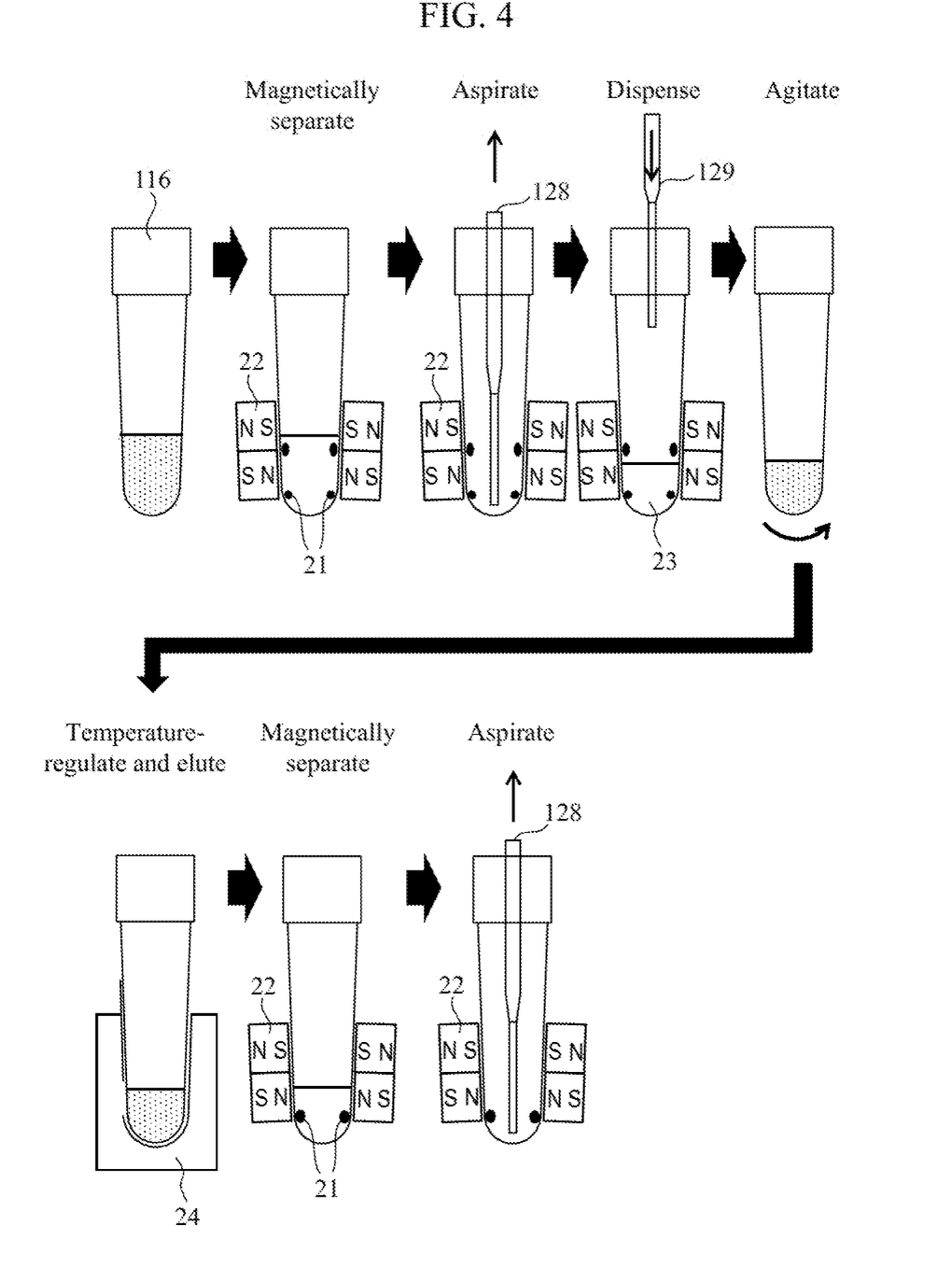
FIG. 4 is a schematic diagram showing a flow of an elution step.

FIG. 4 is a schematic diagram showing a flow of the elution step. FIG. 4 shows a flow after the cleaning step of the third time is performed. After the cleaning step of the third time is completed, the automated analysis device 1 magnetically separates the magnetic particles 21 by the magnetic separation device 124, and aspirates the solution again. Subsequently, the automated analysis device 1 dispenses an amount of an elution solution smaller than that of the reaction solution to the reaction vessel 116, and causes the agitating mechanism 126 to agitate the reaction vessel 116. Thereafter, the automated analysis device 1 transfers the reaction vessel 116 to the reaction vessel disk 120, and temperature-regulates the reaction vessel 116 by an incubator 24 to accelerate the reaction, thereby eluting the substance to be measured from the magnetic particles 21. By performing the magnetic separation again, a concentrated solution containing the substance to be measured excluding the magnetic particles 21 is prepared.

Subsequently, the automated analysis device 1 aspirates a concentrated solution in the reaction vessel 116 on the magnetic separation device 124 by the dispensing mechanism 132 for the detecting unit and dispenses the concentrated solution to the detecting unit 131. The detecting unit 131 includes a unit for detecting a light emission amount, such as a photomultiplier tube, and measures the light emission amount of the reaction solution (finally aspirated concentrated solution). Thereafter, the control unit 102 calculates a concentration value based on light emission data by using a calibration curve, and displays a calculated analysis result on the display unit 104.

Figure 5A:
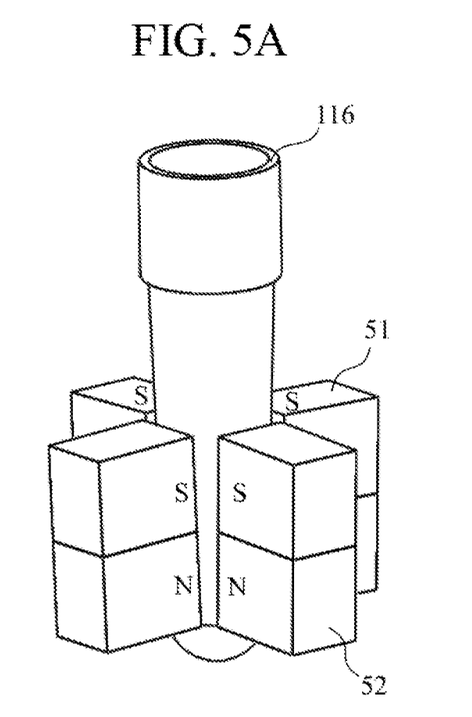
FIGS. 5A to 5C are diagrams showing a configuration example of a magnetic separation device 124.
Figure 5B:
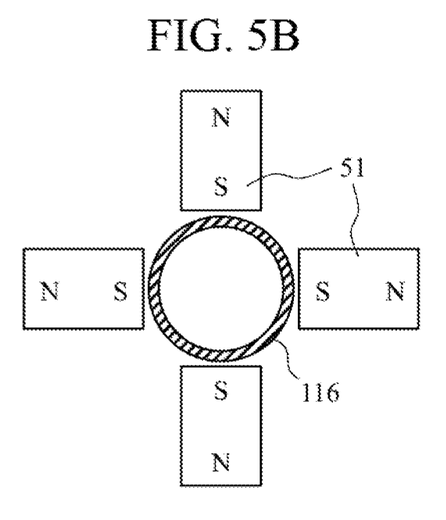
Figure 5C:
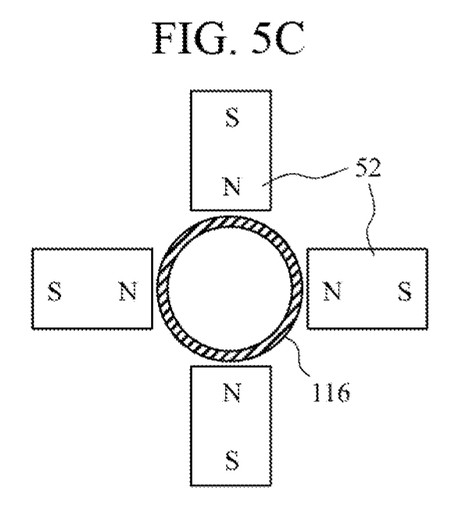

FIG. 5 is a diagram showing a configuration example of the magnetic separation device 124. The magnets 51 and 52 are arranged around a recess into which the reaction vessel 116 is inserted, and the magnetic particles 21 are captured on the inner wall of the reaction vessel 116 by a magnetic field generated by the magnets 51 and 52. FIG. 5(a) shows a positional relationship between the reaction vessel 116 and the magnets 51 and 52. In an example shown in FIG. 5(a), the magnets 51 and 52 are arranged in two upper and lower stages. FIGS. 5(b) and 5(c) are plan views of the magnetic separation device 124. The magnet arrangement of a first stage (upper stage) and a second stage (lower stage) is shown from the top. In the first embodiment, the magnets 51 and 52 of two stages are provided, but the number of stages of the magnets 51 and 52 may be three or more. Although four magnets 51 or 52 are arranged in one stage in the first embodiment, the same effect as that of the first embodiment can be obtained if the number of the magnets is an even number. Six or eight magnets 51 or 52 may be arranged in one stage, for example. The heights of the magnets 51 and 52 of each stage may be the same or different. An arrangement of magnetic poles may also be freely selected.

Figure 6:
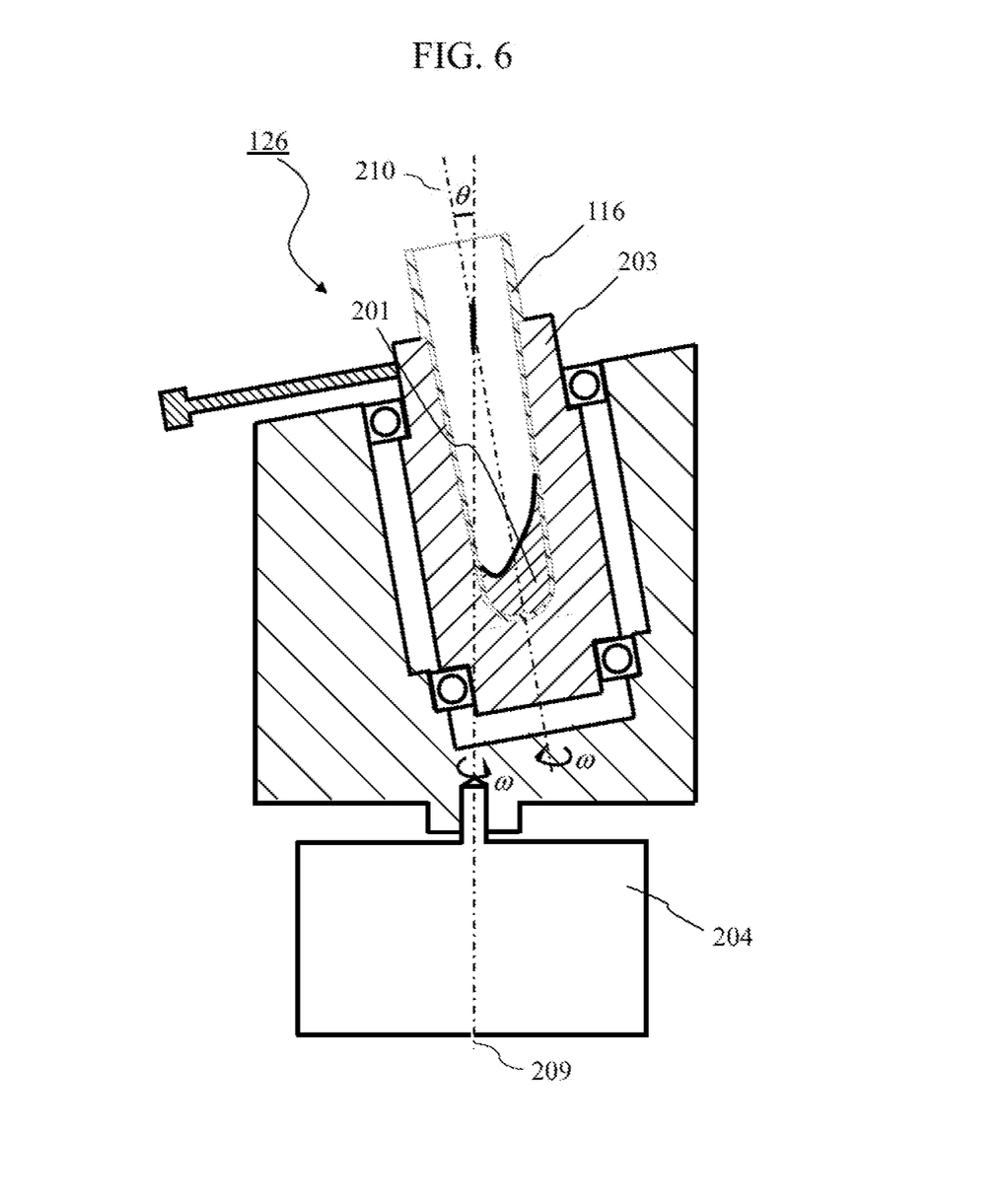
FIG. 6 is a diagram showing a configuration example of a non-contact agitating mechanism 126.

FIG. 6 is a diagram showing a configuration example of the non-contact agitating mechanism 126. As shown in FIG. 6, for example, the agitating mechanism 126 includes a mechanism that causes the reaction vessel 116 to perform a rotational operation that is a combination of rotation and revolution, that is, a mechanism that performs rotation and revolution agitating. The agitating mechanism 126 includes a reaction vessel holder 203 and a rotary drive generator 204. The reaction vessel holder 203 can hold the reaction vessel 116 containing a magnetic particle solution 201. The rotary drive generator 204 is, for example, a motor. An inclination of a rotation axis 210 with respect to a revolution axis 209, that is, an inclination of the reaction vessel 116 is configured to form an angle θ. The revolution and the rotation have the same number of rotations, and rotation directions thereof are opposite.

Figure 7:
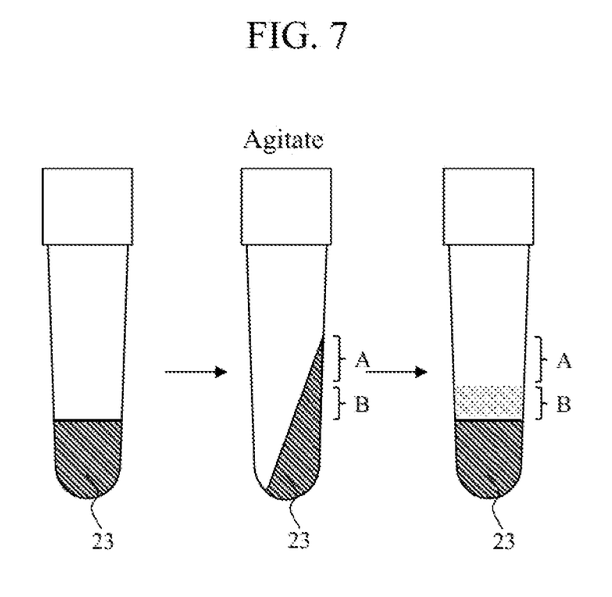
FIG. 7 is a diagram showing a phenomenon in which magnetic particles 21 remain on an inner wall of a reaction vessel 116 in an agitating step.

FIG. 7 is a diagram showing a phenomenon in which the magnetic particles 21 remain on the inner wall of the reaction vessel 116 in an agitating step. In the present disclosure, a mechanism of the magnetic particles 21 remaining is clarified by visualizing a behavior of the solution at a time of agitating using a high-speed camera and a transparent agitator. The liquid in the vessel is rotated in a state where the liquid surface of the solution in the reaction vessel 116 is inclined by a centrifugal force involved in agitation. An upper part of the liquid surface is defined as an area A, and a part between the non-operation-time liquid surface and a lower part of the area A is defined as an area B. It is found that the magnetic particles 21 do not remain on the wall surface in the area A and the magnetic particles 21 remain in the area B. Further, it is clarified that the magnetic particles 21 do not remain on the wall surface during rotation, but remain on the wall surface during deceleration at an end of the rotation. From the above, it can be seen that, in the agitating step, the magnetic particles remaining on the wall surface can be removed as long as the liquid surface in the next cleaning step can reach the magnetic particles remaining on the wall surface in the previous cleaning step.

Figure 8:
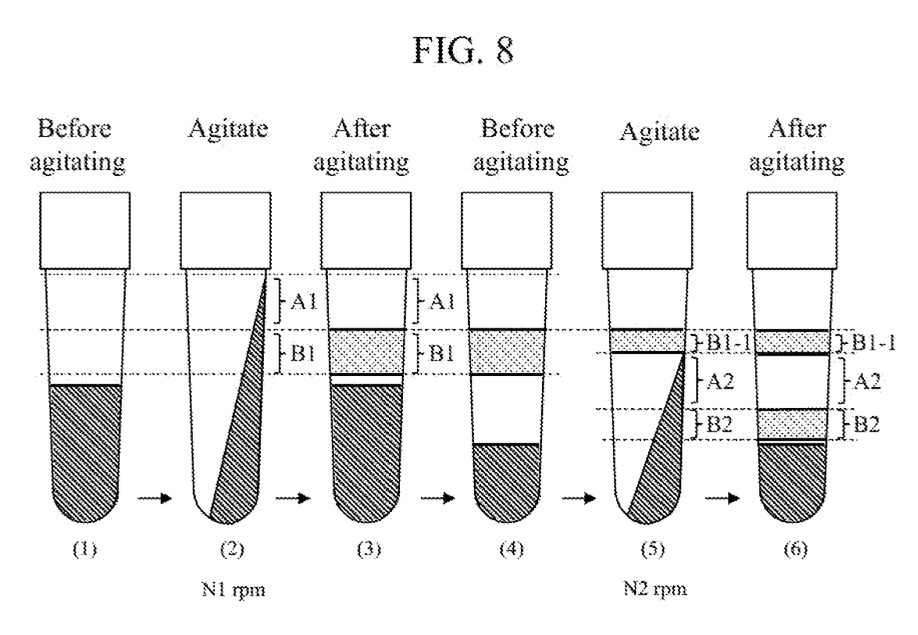
FIG. 8 is a diagram showing a mechanism in which the magnetic particles 21 remain on the inner wall of the reaction vessel 116.

FIG. 8 is a diagram showing a mechanism in which the magnetic particles 21 remain on the inner wall of the reaction vessel 116. Step (1) is an initial state, in which the reaction vessel 116 contains the solution in which the magnetic particles 21 are suspended. Step (2) is an agitating operation, in which the liquid surface is inclined with agitating and rotates at a constant speed inside the vessel. Step (3) shows a state in which agitating is completed. As shown in FIG. 7, the magnetic particles 21 do not remain in an area A1 which is the upper part of the liquid surface, and the magnetic particles 21 remain in the area B below the area A1. Step (4) shows a state in which the amount of the solution is reduced in a cleaning process including magnetic separation, aspiration, and dispensation. In step (5), the agitating is performed again. In an area A2, the remaining magnetic particles 21 can be removed. However, when the rotation speed (number of rotation) is N1=N2 or N1>N2 at the time of agitating, the magnetic particles 21 remain in an upper area B1-1 since the liquid surface cannot reach a sufficient height. Further, the magnetic particles 21 remain in a rotation area B2. Finally, in step (6), the magnetic particles 21 remain in the area B1-1 and the area B2, and the magnetic particles 21 remain in a band shape on the wall surface of the reaction vessel 116.

Figure 9:
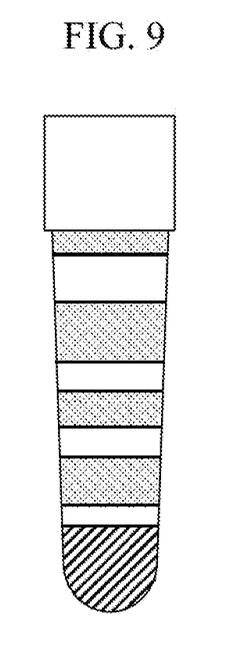
FIG. 9 is a diagram showing a result of the magnetic particles 21 remaining in a band shape.

FIG. 9 is a diagram showing a result of the magnetic particles 21 remaining in the band shape. The magnetic particles 21 remain in a form of four bands throughout the overall reaction vessel 116 as shown in FIG. 9 by performing a concentration and cleaning process including cleaning of three times and elution of one time as shown in FIG. 2.

Figure 10:
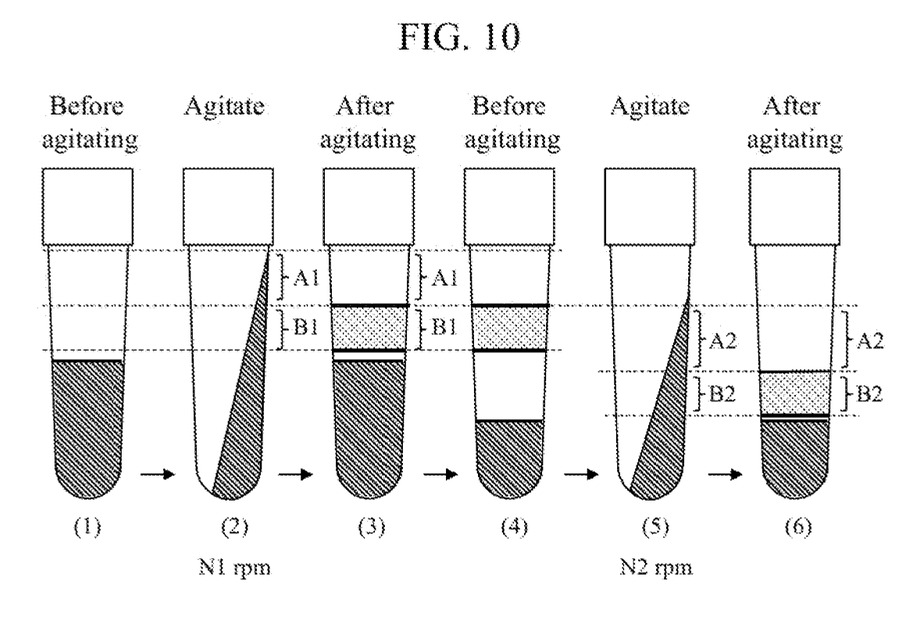
FIG. 10 is a diagram showing a cleaning step performed by the automated analysis device 1 according to the first embodiment.

FIG. 10 is a diagram showing the cleaning step performed by the automated analysis device 1 according to the first embodiment. In the first embodiment, each time the cleaning step is performed, an amount of the magnetic particle solution in the reaction vessel 116 is reduced in a stepwise manner, and an angle of the liquid surface is inclined such that the liquid surface reaches at least an upper end of the area B1 generated in the previous cleaning step. Accordingly, a quantity of the magnetic particles 21 remaining on the wall surface of the reaction vessel 116 can be reduced. That is, it is possible to prevent the magnetic particles 21 from remaining on the band, reduce the number of the magnetic particles 21 remaining during the cleaning and concentration step, and prevent the concentration efficiency from being lowered. Further, since the magnetic particles 21 remaining on the inner wall of the reaction vessel 116 can be reduced, variations in the measurement results due to the remaining can be prevented.

A simplest method for controlling the angle of the liquid surface is to change the rotation speed of the agitating mechanism 126. Specifically, it is important to set N1<N2. Accordingly, an arrival position of the liquid surface can be raised even in a subsequent step in which the amount of the cleaning solution is small, and a remaining quantity of the magnetic particles 21 can be reduced.

First Embodiment: Overview

The automated analysis device 1 according to the first embodiment reduces the amount of the cleaning solution each time the cleaning step is performed on the same sample, and increases the rotation speed of the agitating mechanism 126. As a result, the magnetic particles 21 remaining on the wall surface of the reaction vessel 116 can be reduced while saving the cleaning solution.

Second Embodiment

As a result of visualizing a behavior of a solution during agitating, it is found that the magnetic particles 21 do not remain on a wall surface while a vessel is rotating, but remain on the wall surface at a time of deceleration at an end of the rotation. In a second embodiment of the present disclosure, an example of a cleaning and concentration step for reducing the remaining quantity of the magnetic particles 21 will be described focusing on this. A configuration of the automated analysis device 1 is the same as that of the first embodiment.

Figure 11:
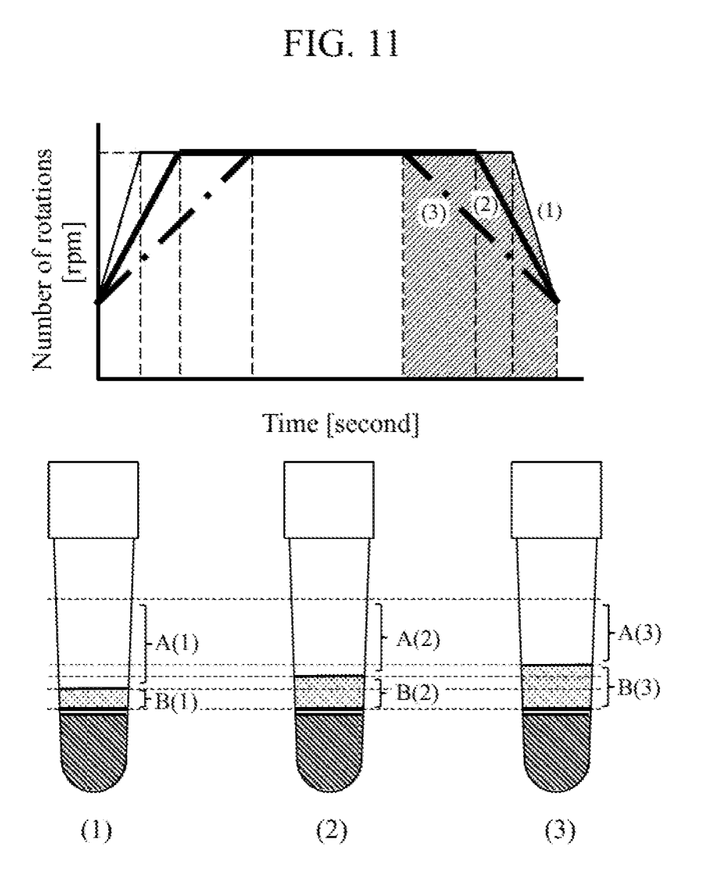
FIG. 11 shows a result of examining a relationship between a deceleration at an end of agitating and an area of the magnetic particles 21 remaining on a wall surface of the reaction vessel 116.

FIG. 11 shows a result of examining a relationship between a deceleration at an end of agitating and an area of the magnetic particles 21 remaining on a wall surface of the reaction vessel 116. As shown in an upper part of FIGS. 11, (1), (2), and (3) are set in descending order of deceleration at the end of the agitation. A lower part of FIG. 11 shows remaining areas of the magnetic particles 21 at that time. A deceleration of the agitation is set at 18760 rpm/s in (1), 9343 rpm/s in (2), and 3114 rpm/s in (3). As is clear from the lower part of FIG. 11, when the deceleration is (1), the remaining area is the smallest. That is, the remaining area is reduced in an order of a remaining region B in (3)>a remaining region B in (2)>a remaining region B in (1).

According to the above results, a quantity of the magnetic particles 21 remaining on the wall surface can be reduced by increasing the deceleration of the rotation speed for at least the last cleaning step. When there is a concern that a life of a motor is shortened by increasing the deceleration, the deceleration may be reduced in the cleaning step other than the last cleaning step, and the deceleration may be increased in the last cleaning step.

Third Embodiment

The magnetic particles 21 having a small size are less likely to be attracted by the magnets 51 and 52, and tend to remain in a liquid. According to the result of the second embodiment, in order to leave such magnetic particles 21 on a wall surface of the reaction vessel 116, it is considered that a deceleration of a rotation speed may be reduced. For example, in an elution step, since it is not necessary to capture the magnetic particles 21 into the liquid, the deceleration may be reduced. A cleaning step may be performed in the same manner as in the first to the second embodiments.

Fourth Embodiment

Figure 12:
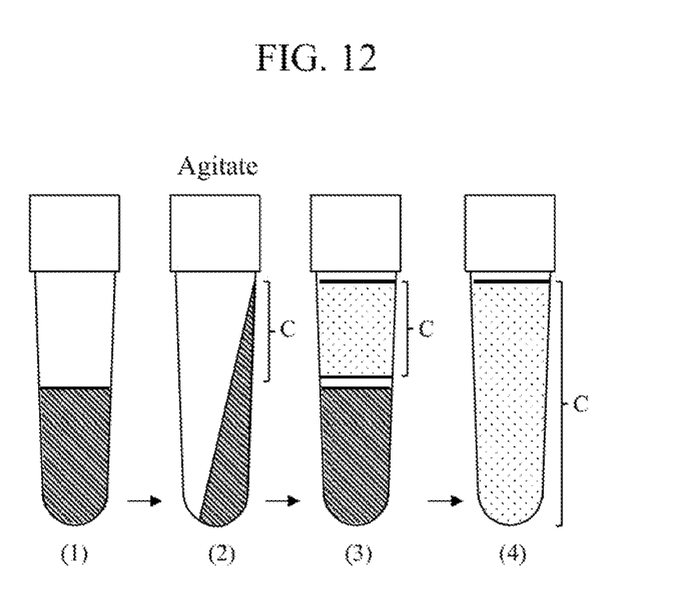
FIG. 12 is a diagram showing an additional step to be performed in a fourth embodiment.

FIG. 12 is a diagram showing an additional step to be performed in a fourth embodiment of the present disclosure. In the above embodiment, it is described that cleaning steps of three times and an elution step of one time are performed. In the fourth embodiment, the following is performed as a pre-stage of these cleaning and concentration steps. A configuration of the automated analysis device 1 is the same as those of the first to third embodiments.

In step (1), a solvent such as acetonitrile is contained in the reaction vessel 116. In step (2), the solvent is agitated once. As a result, as shown in step (3), a wall surface of the reaction vessel 116 is wetted with acetonitrile. In step (4), all acetonitrile is aspirated and discarded. Thereafter, as described in the first to second embodiments, the cleaning step and the elution step are performed. In the fourth embodiment, since the wall surface of the reaction vessel 116 is wetted with the solvent, the remaining quantity of the magnetic particles 21 can be greatly improved.

Modification of Disclosure

The disclosure is not limited to the embodiments described above, and includes various modifications. For example, the embodiments described above have been described in detail for easy understanding of the disclosure, and the invention is not necessarily limited to those including all the configurations described above. A part of configurations of an embodiment may be replaced with configurations of another embodiment, or the configurations of one embodiment may be added to the configurations of another embodiment. A part of a configuration of an example in each embodiment can be added to, deleted from, or replaced with another configuration.

The embodiments described above can be applied to general automated analysis devices. For example, the embodiments described above can be applied to an automated analysis device such as a biochemical automated analysis device, a gene analysis device, a mass spectrometric device, and a bacteria inspection device.

In the above embodiment, the magnetic separation device 124 separates the magnetic particles 21 using the magnets 51 and 52, but the magnetic particles 21 may be separated using other magnetic field generating mechanisms.

REFERENCE SIGNS LIST

1: automated analysis device
101: analysis unit
102: control unit
103: input unit
104: display unit
111: sample vessel
112: first transport mechanism
113: sample dispensing mechanism
114: dispensing tip attaching and detaching unit
115: dispensing tip mounting rack
116: reaction vessel
117: reaction vessel mounting rack
118: second transport mechanism
119: opening
120: reaction vessel disk
121: reagent vessel
122: reagent disk
123: reagent dispensing mechanism
124: magnetic separation device
125: transport and aspiration dispensing mechanism
126: agitating mechanism
127: gripping mechanism
128: aspiration nozzle
129: dispensing nozzle
131: detecting unit
132: dispensing mechanism for detecting unit
201: magnetic particle solution
203: reaction vessel holder
204: rotary drive generator
209: revolution axis
210: rotation axis
21: magnetic particle
23: cleaning solution
24: incubator
51: first-stage magnet
52: second-stage magnet

The invention claimed is:

1. An automated analysis device that measures a liquid sample containing magnetic particles and a substance to be measured, the automated analysis device comprising:
    a magnetic separation device configured to separate the magnetic particles from the liquid sample;
    an aspiration nozzle configured to aspirate the liquid sample from a vessel containing the liquid sample after the magnetic particles are separated;
    a dispensing nozzle configured to dispense a cleaning solution to the vessel after the aspiration nozzle aspirates the liquid sample;
    an agitating mechanism configured to perform agitating by rotating the vessel in which the cleaning solution is dispensed; and
    a control unit configured to control the aspiration nozzle, the dispensing nozzle, and the agitating mechanism, wherein
    after the magnetic separation device separates the magnetic particles from the liquid sample, the control unit controls the dispensing nozzle to dispense the cleaning solution and controls the agitating mechanism to rotate the vessel, so as to perform a cleaning step for removing the substance other than the magnetic particles from the liquid sample, and the cleaning step is performed a plurality of times on the same liquid sample,
    the control unit reduces an amount of the cleaning solution each time the cleaning step is performed, and
    the control unit is configured to causes the agitating mechanism to operate in such a way that a rotation speed of the vessel is increased each time the cleaning step is performed on the same liquid sample.

2. The automated analysis device according to claim 1, wherein
    the control unit is configured to cause the agitating mechanism to operate in such a way that a liquid surface of the cleaning solution when the agitating mechanism rotates the vessel is gradually made closer to vertical each time the cleaning step is performed on the same liquid sample.

3. The automated analysis device according to claim 1, wherein
    the control unit is configured to cause the agitating mechanism to operate in such a way that a liquid surface of the cleaning solution reaches the magnetic particles remaining on a wall surface of the vessel in the previous cleaning step each time the cleaning step is performed on the same liquid sample.

4. The automated analysis device according to claim 1, wherein the control unit is configured to reduce the rotation speed of the vessel more rapidly when the last cleaning step performed on the same liquid sample is completed than when the cleaning step performed before the last cleaning step is completed.

5. The automated analysis device according to claim 1, wherein before starting the cleaning step, the control unit is configured to control the dispensing nozzle to dispense an organic solvent to the vessel and controls the agitating mechanism to rotate the vessel, and thus a wall surface of the vessel is wetted with the organic solvent, the control unit controls the aspiration nozzle to aspirates the organic solvent from the vessel after the wall surface of the vessel is wetted with the organic solvent, and the control unit is configured to perform the cleaning step after the organic solvent is aspirated from the vessel.

\* \* \* \* \*